UNITED STATES PATENT OFFICE.

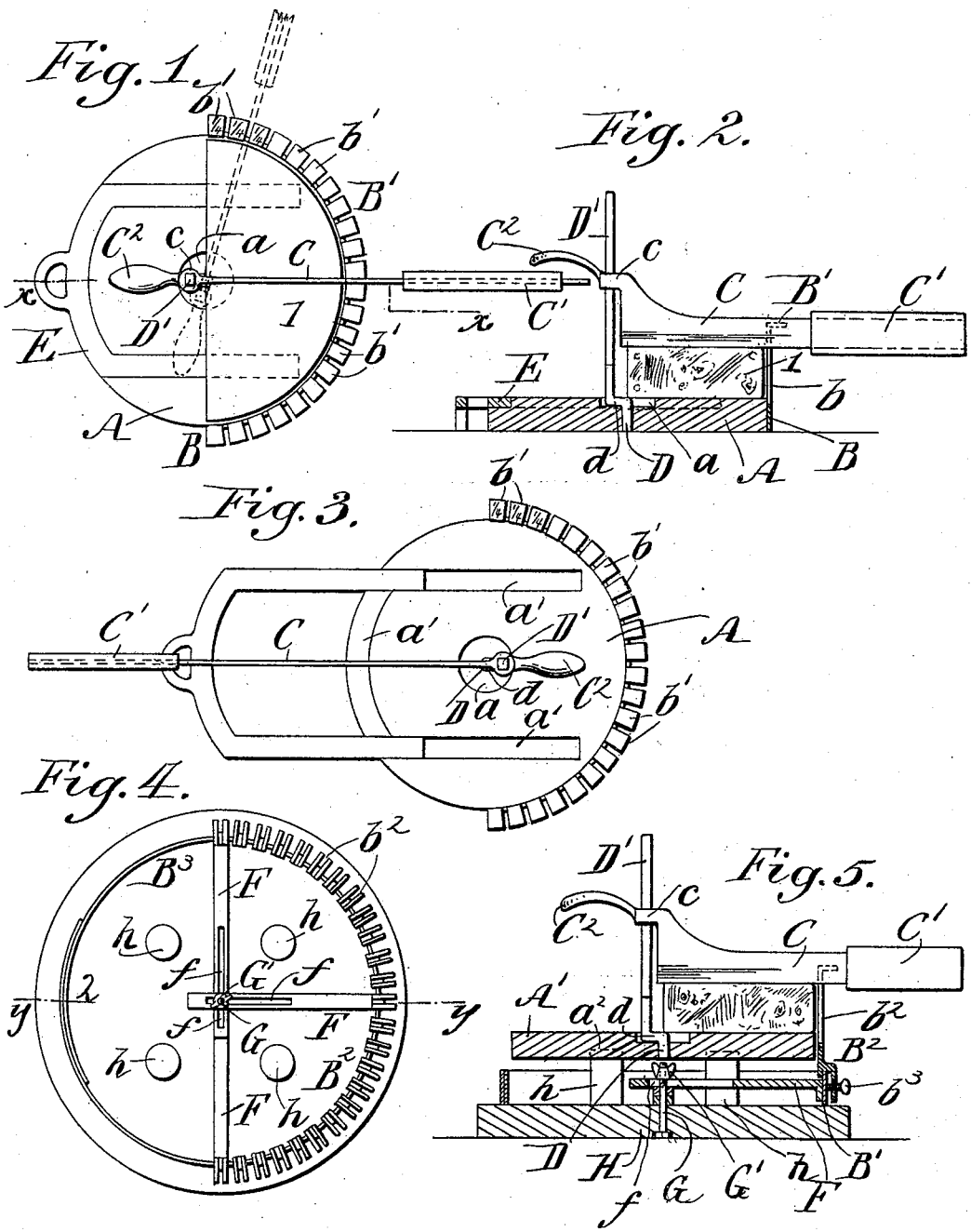

FLORA H. REEVE, OF NEW YORK, N. Y.

CHEESE-CUTTER.

SPECIFICATION forming part of Letters Patent No. 627,708, dated June 27, 1899.

Application filed August 13, 1898. Serial No. 688,486. (No model.)

*To all whom it may concern:*

Be it known that I, FLORA H. REEVE, a citizen of the United States, and a resident of New York city, county of New York, and State of New York, have invented certain new and useful Improvements in Cutting Apparatus, of which the following is a specification, reference being had to the accompanying drawings, forming a part thereof, in which similar letters and numerals of reference indicate corresponding parts.

This invention relates to an improved cutting apparatus of the class adapted for accurately dividing a substance into a plurality of pieces of predetermined size and weight.

The device is especially applicable for the use of retailers as a means for cutting cheese, the objects thereof being to save time on the part of the dealer and to prevent waste of the substance being sold.

The device is simple in construction, inexpensive, and durable, and it acts as a receptacle, as well as an efficient dividing and cutting means.

The invention will be hereinafter fully described, and specifically set forth in the annexed claims.

In the accompanying drawings, forming part of this specification, Figure 1 is a plan view of my improved device. Fig. 2 is a sectional elevation taken on the line $x\,x$ of Fig. 1. Fig. 3 is a plan view illustrating a change of position. Fig. 4 is a plan view illustrating a modification, and Fig. 5 is a sectional elevation taken on the line $y\,y$ of Fig. 4.

In the practice of my invention I provide, primarily, a wooden base A of circular contour. This said base is surrounded upon half its diameter with a metallic strip B, having a flange B' extended outwardly from its upper edge. This said strip is supplied with a plurality of slits $b$, which extend to a point below the upper edge of the base A and project radially through the flanged portion B', thus providing a series of segments $b'$ of equal proportion. These said segments are supplied with figures indicating a predetermined weight—for instance, one-quarter of a pound—and the distances between each slit $b$ being equal it is obvious that the knife will cut segments of cheese of equal size and weight, thus avoiding the necessity of using an auxiliary scale. The knife C employed for cutting the cheese has a sleeve $c$ formed upon the inner end thereof, and this said sleeve engages a square spindle D', which is extended upwardly from a crank-arm $d$ of a revoluble vertical shaft D, journaled through the center of the base A. All these said parts are preferably formed integral with each other, and the crank-arm operates within a circular countersunk recess $a$ of the base A, thus maintaining a smooth upper surface of the said base. The knife C is provided with a sliding handle C', secured around the blade thereof, and also with an auxiliary handle $C^2$, projected from the sleeve $c$, whereby an operator can put sufficient pressure upon the knife to readily cut the cheese.

The base A is further provided with a sliding platform E, which is of approximately U-shaped contour and is countersunk within grooves $a'$ of the base A. This said platform is adapted to slide outwardly for the purpose of receiving a whole cheese, and the sliding handle G' is movable outwardly for the purpose of supplying a blade equal in length to the diameter of the cheese, whereby the cheese can be cut into halves. One half thereof, as indicated at 1, Figs. 1 and 2 of the drawings, is then placed upon the cutter in position ready to be divided into segments.

In the modifications illustrated by Figs. 4 and 5 of the drawings the guiding-slits $b^2$ form part of movable slides $B^2$, mounted upon a resilient metallic ring $B^3$, which is adapted to be adjusted to variable diameters, the slides being movable thereon for the purpose of adjusting them in accordance with the diameter of the ring, and they are held in any desired position on the said ring by means of thumb-nuts $b^3$. The ring $B^3$ has overlapping ends, as illustrated at 2, Fig. 4 of the drawings, and it is mounted upon a series of radially-extended arms F, having slots $f$ formed therein. These said slots engage a centrally-located spindle G, formed in the base H, upon which the device is mounted, and they are held in any predetermined position by means of a thumb-nut G', which is threaded to the upper end of the spindle G. In this construction the circular base A' for receiving the cheese is mounted upon a series of posts $h$, projected upwardly from the base A, the upper ends of these said posts engaging the recesses $a^2$ of the base A', whereby the said base is maintained in accurate position. The construction of the knife is the same in this instance as that illustrated in Figs. 1, 2, and 3 of the drawings.

In the operation and use of the device it is simply necessary to halve the cheese, as before described, and then place one half thereof in position, as shown by Fig. 1 of the drawings. Segments of equal weight and size will then be cut from the cheese and sold without the necessity of employing an auxiliary measure or weight, thus greatly facilitating the business of cutting and selling the cheese and obviating all danger of wasting the cheese.

Having thus described my invention, what I claim as new, and desire to secure by Letters Patent, is—

1. As a cutting apparatus, the combination of a circular base having a semicircular strip upon half its diameter, said strip being supplied at its upper edge with a flange and with a series of vertical slits, which extend through the said flange forming segments for containing markings, and a swinging vertically-slidable knife, and a spindle upon which the knife is mounted, substantially as shown and described.

2. As an apparatus for cutting cheese, the combination of a circular base having a semicircular strip upon half its diameter, said strip being supplied at its upper end with a flange and with a series of vertical slits, which extend through the said flange forming segments of equal proportion, a vertically-sliding knife, a square spindle upon which the knife is mounted, a crank-arm carrying said spindle, and a centrally-located revoluble shaft journaled in the said base and carrying the crank-arm, substantially as shown and described.

3. As a device for cutting cheese, the combination of a circular base having a sliding platform connected thereto and a semicircular series of guides extended radially, and a vertically-movable knife for engaging the said guides, said knife being mounted upon a squared spindle, a crank-arm carrying said spindle, and a centrally-located revoluble shaft carrying the crank-arm, said knife also being supplied with a sliding handle and with an auxiliary handle substantially as shown and described.

4. As a cheese-cutting apparatus, the combination of an adjustable ring adapted to be expanded and contracted, and a series of movable guides attached to the said ring, and means for moving the guides and for expanding and contracting the ring; with a knife, a squared spindle upon which the knife is mounted, a crank-arm carrying said spindle, a revoluble shaft carrying the crank-arm and located centrally of the said ring, and a circular base mounted above said ring, upon which base the shaft is journaled, substantially as shown and described.

In testimony that I claim the foregoing as my invention I have signed my name, in presence of two witnesses, this 12th day of August, 1898.

FLORA H. REEVE.

Witnesses:
M. G. McLEAN,
L. J. McGHIE.